June 23, 1925.
C. H. TOMLINSON
COUPLER
Filed July 12, 1920 2 Sheets-Sheet 1
1,543,304
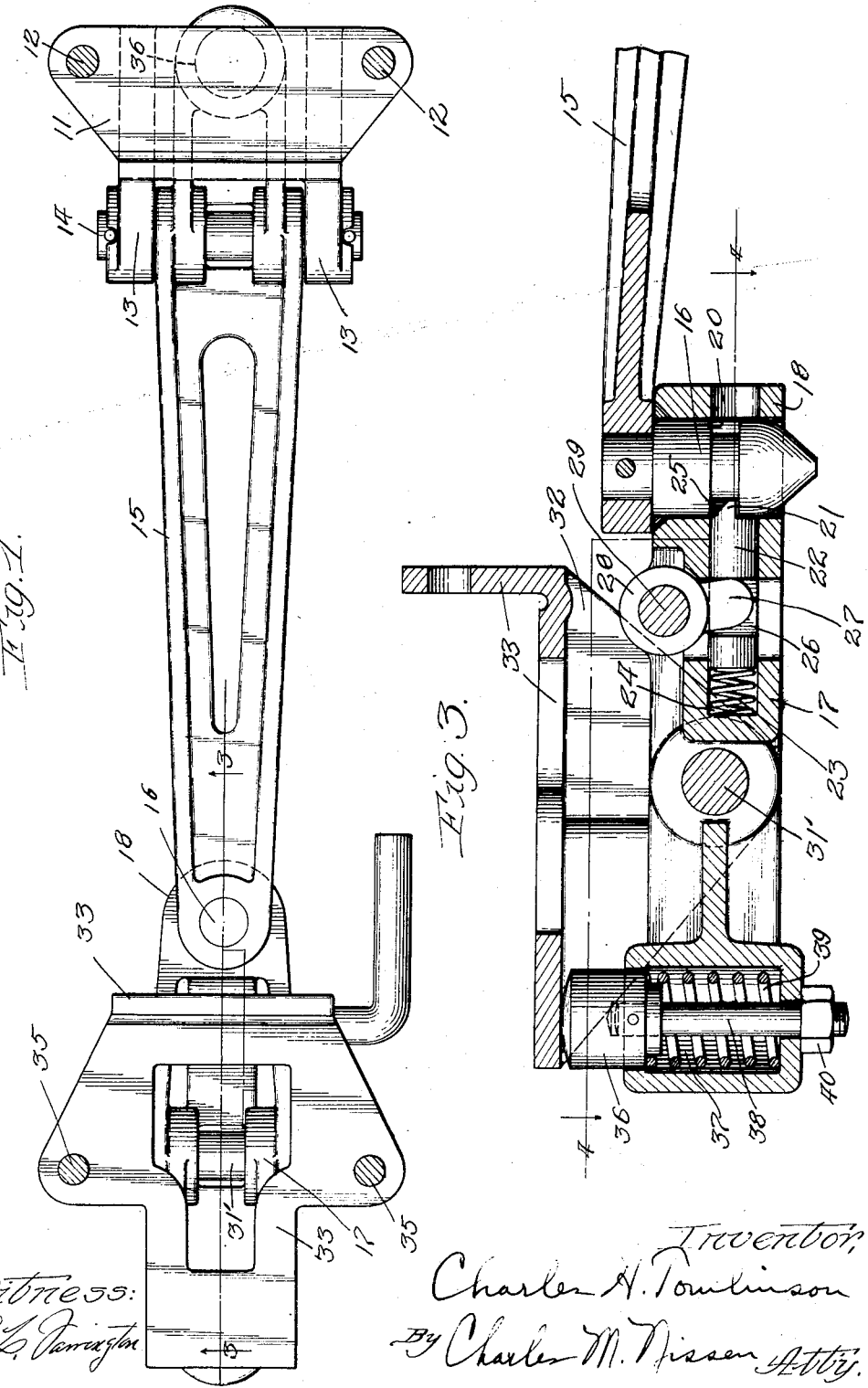

June 23, 1925.
C. H. TOMLINSON
COUPLER
Filed July 12, 1920  2 Sheets-Sheet 2
1,543,304
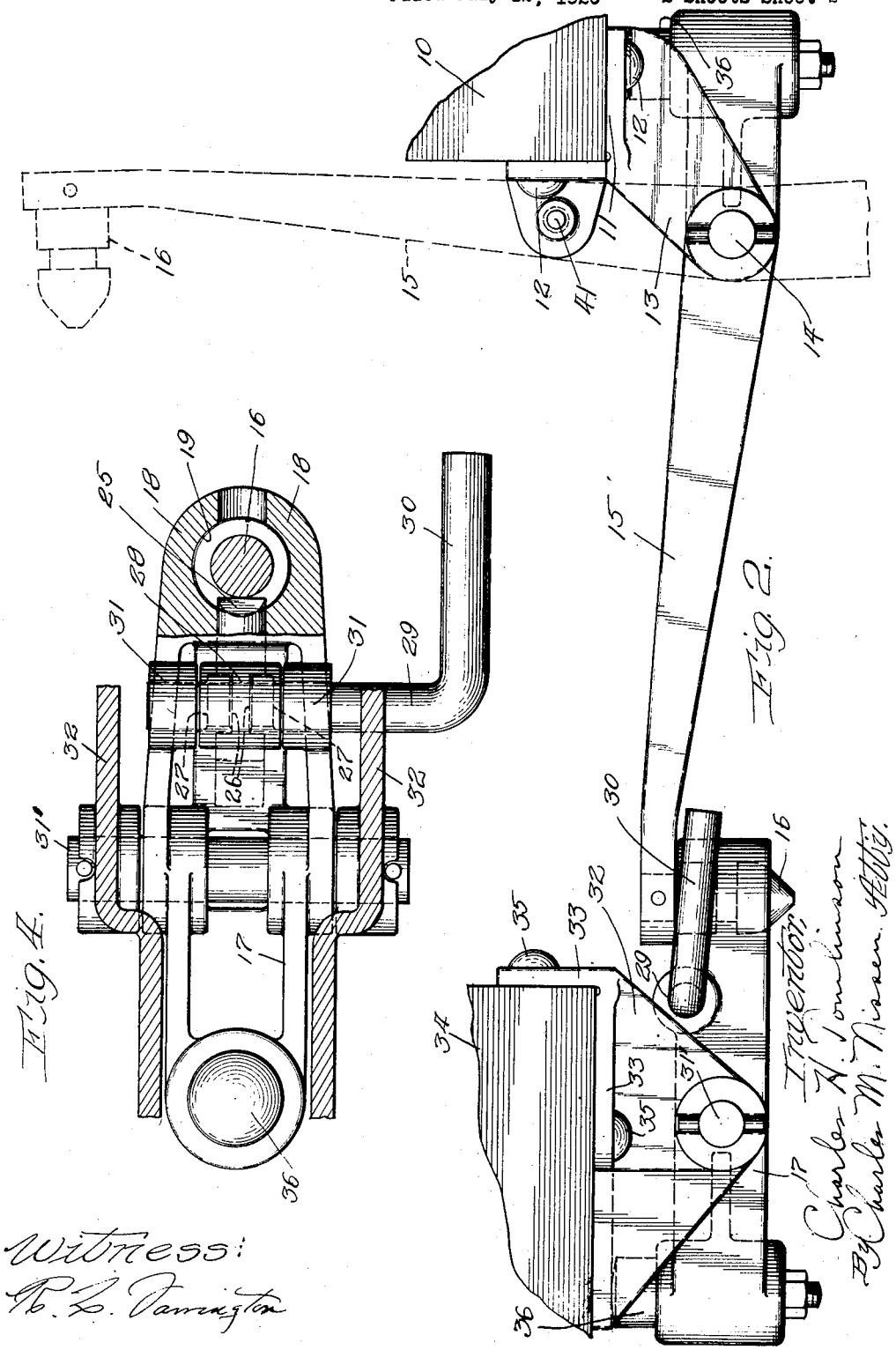

Patented June 23, 1925.

1,543,304

UNITED STATES PATENT OFFICE

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

COUPLER.

Application filed July 12, 1920. Serial No. 395,544.

*To all whom it may concern:*

Be it known that I, CHARLES H. TOMLINSON, a citizen of the United States, residing at Mansfield, in the county of Richland and State of Ohio, have invented certain new and useful Improvements in Couplers, of which the following is a specification.

This invention has for its object the provision of devices of the class named which shall be of improved construction and operation.

The invention is exemplified in the combination and arrangement of parts shown in the accompanying drawings and described in the following specification, and it is more particularly pointed out in the appended claims, the exemplification illustrated being the best now known to applicant.

In the drawings—

Fig. 1 is a top plan view of a pair of couplers embodying the best form of the present invention now known to applicant;

Fig. 2 is a side elevation of the couplers shown in Fig. 1;

Fig. 3 is a vertical section substantially on line 3—3 of Fig. 1; and

Fig. 4 is a horizontal section on line 4—4 of Fig. 3.

Couplers comprising the present invention are adapted to be used on various forms of vehicles and cars, and are especially suitable for relatively light cars and trucks. Each coupler comprises a pair of cooperating members, one of which is secured to the rear of the forward one of two coupled cars, while the other is attached to the front of the trailer. The coupler connected with the car usually in front is provided with a pivoted connecting bar, while the coupler on the rear car is provided with a socket for receiving a stud or pin carried by the connecting bar.

In Fig. 2 of the drawings, the numeral 10 designates a fragmentary portion of the rear end of a car or truck to which a bracket 11 is secured by bolts or rivets 12. The bracket 11 is provided with downwardly and rearwardly extending ears 13 which support a pivot pin 14 upon which the coupling bar 15 is mounted to swing vertically from the full line position in Fig. 2 to the inactive position shown in broken lines in that figure. The rear end of the bar 15 carries a stud 16 arranged to engage the complementary coupling member 17 on the trailer. The coupling member 17 is provided with a forwardly extending eye 18 having a vertical socket 19 therein for receiving the stud 16. The stud 16 is provided with a peripheral groove 20 into which the nose 21 of a latch pin 22 may be projected for retaining the stud 16 and the eye member 18 in coupled relation.

A coil spring 23 is seated in a socket 24 in the rear of the latch bolt 22 and normally urges the bolt forwardly into the groove 20. The upper face of the nose 21 is beveled, as shown at 25, and the lower end of the stud 16 is tapered so that when the stud moves downwardly into the opening 19 the latch 22 will be sprung backwardly until the groove 20 is in position to receive the nose 21. The latch will then be automatically moved by the spring 23 into position to hold the parts in coupled relation. The latch bolt 22 is provided with slots 26 on its lateral faces for receiving a pair of lugs 27 which extend downwardly from a collar 28 rigidly secured to a latch bar 29 having a handle 30 thereon. The bar 29 is journaled in bearing bosses 31 formed on the coupling member 17. It will be apparent that rotation of the handle 30 will disengage the latch bolt 22 from the stud 16 and permit of uncoupling of the members. The coupling member 17 is pivotally supported by a pin 31ª carried by a pair of spaced ears 32 which project downwardly from a bracket 33 secured to the rear car 34 by rivets or bolts 35.

Each of the coupling members 15 and 17 is provided with a spring stop 36 for limiting the downward movement of the coupling ends of the two members. The spring stops 36 are mounted to slide in sockets 37 and are held within their sockets by bolts 38. A coil spring 39 bears upon the bottom of each socket 37 and against the under face of each spring stop 36 to normally force the stop 36 to the upper limit of its movement. The position of the stops 36 relative to the coupling members may be adjusted by means of the nuts 40 on the lower ends of the bolts 38. The upper surface of each stop 36 bears against the lower face of the bracket members by which the couplers are secured to the cars. It will be apparent from Fig. 2 that the spring stops 36 normally retain the couplers 15 and 17 in a horizontal position, but when a pair of coupled cars pass over an uneven portion of a road or track the cars are free to move vertically relative to one another because of the yielding of the spring stops 36 in their sockets. Each coupling member 15 and 17, although free to swing vertically a limited amount, is rigidly maintained in alinement with the center line of the cars to which they are connected. The pivotal movement of the cars relative to one another takes place about the axis of the stud 16 and it will be observed that the member 15 is long enough to substantially bridge the space between the two cars, while the eye in the member 17 is located closely adjacent the front end of the trailer. By this arrangement the front end of the trailer is maintained substantially in alinement with the center line of the forward car, and as a result a pair of coupled cars when drawn about a curve will tend to track more accurately than would be the case if the pivotal connection were nearer the rear of the forward car.

A spring catch or button 41 is provided for holding the coupling member in its upper or inoperative position.

I claim:—

1. In combination, a pair of coupling members for vehicles, means rigidly fixed to said vehicles for supporting said coupling members intermediate the ends thereof for vertical pivotal movement, means on one end of each of said members for engaging the other of said members, and means on the other end of each of said members for yieldingly maintaining said coupling members against vertical pivotal movement in one direction, while permitting free vertical pivotal movement thereof in the opposite direction.

2. In combination, a pair of elongated coupling members, means for pivotally connecting said coupling members intermediate the ends thereof to adjacent ends of cars to be connected to one another to permit vertical movement of the coupling ends of said members, and means on each of said coupling members at the opposite side of its pivotal support from the coupling end thereof for yieldingly holding each of said members against vertical movement in one direction about the pivotal connection with its car while permitting free movement thereof in the opposite direction.

3. In combination, a pair of complementary couplers for connecting adjacent ends of cars, each of said couplers being pivotally connected to its car to swing vertically, means movable into cooperative relation by vertical swinging movement for connecting the cooperating ends of said couplers for horizontal pivotal movement relative to one another and for holding said couplers against pivotal movement vertically relative to one another, and yielding means for limiting the downward movement of said cooperating ends relative to said cars while permitting free upward movement of said couplers when separate from one another.

4. In combination, a pair of complementary coupling members, means for pivotally securing each member adjacent the end of a car for vertical movement and for holding said members against lateral movement relative to said cars, a pin and eye connection adjacent one of said cars for pivotally connecting the cooperating ends of said coupling members for horizontal movement relative to one another, and spring stops for limiting the downward movement of the cooperating ends of said couplers relative to said cars.

5. In combination, a pair of cooperating coupling members, one of which is longer than the other, means for pivotally connecting each of said coupling members adjacent the end of a car to permit vertical movement of said coupling members relative to said cars but to prevent lateral movement of said members on said cars, means for pivotally connecting the cooperating ends of said coupling members to one another to permit lateral movement of said coupling members about a fixed pivotal axis adjacent one of said cars, and a spring stop cooperating with each of said coupling members to limit the downward movement of the coupling ends of said members.

6. In combination, an elongated coupling member, pivotally connected intermediate its ends to a fixed pivot on a car so that one end of said member projects beyond the end of said car, the opposite end of said member being provided with a socket, and a spring-pressed plunger arranged within said socket for resiliently limiting the downward movement of the projecting end of said coupling member.

7. In combination, a pair of elongated coupling members, means for pivotally connecting each of said members intermediate its ends to a car so that one end of each member projects beyond the end of its car, the projecting ends of said members being of unequal length so that one of said members substantially bridges the space between said cars, and means for pivotally connecting the projecting ends of said members to one another at a point adjacent the end of one of said cars.

8. In combination, a pair of elongated coupling members, means for pivotally connecting each of said members intermediate its ends to a car so that one end of said member projects beyond the end of said car, the projecting ends of said members being of unequal length so that one of said members approximately bridges the space between said cars, means for yieldingly limiting the downward movement of the projecting ends of said members to an approximately horizontal position, and means for pivotally connecting the projecting ends of said members to one another to permit horizontal movement of said members relative to one another when so connected.

9. In combination, a coupler comprising a bar having a pivot stud on one end thereof, means for pivotally connecting said bar adjacent the opposite end thereof to the end of a car so that said bar may swing upwardly about its pivot into uncoupled position, means for limiting the downward movement of said bar about said pivot, a complementary coupling member having an eye for receiving said stud, and yielding means for supporting said complementary member.

10. In combination, a pair of complementary coupling members, one of said members being yieldingly supported and provided with a pivot socket, while the other of said members carries a pivot pin for engaging said socket, means for pivotally connecting one of said members to a car to permit said member to swing vertically to move said pivot pin and socket into and out of engagement, said member being of sufficient length to substantially bridge the space between the cars coupled by said members so that the pivotal connection between said members will be positioned adjacent the end of one of said cars.

11. In combination, a pair of complementary coupling members, one of said members being provided wtih a pivot socket, while the other of said members carries a pivot pin rigidly connected therewith for engaging said socket, said pin and socket having tapered guides for directing said pin into said socket, means for pivotally connecting each of said members to a car to permit vertical movement of said member relative to said car but to prevent lateral movement of said member relatve to said car and yielding means for each of said members for limiting the vertical movement thereof.

12. In combination, a pair of elongated complementary coupling members, each of said members being pivotally connected with a car so that one end thereof projects beyond the end of said car, the projecting ends of said members being of unequal length to permit one of said members to substantially bridge the space between said cars, yielding means for limiting the downward movement of the projecting ends of said members to substantially horizontal position, one of said members having a pivot socket in the projecting end thereof, while the other of said members is provided with a pivot pin for engaging said socket, said pin and socket having tapered guides for facilitating their movement into coupled relation with one another, and a latch for holding said pin and socket in coupled relation.

13. In combination, a pair of complementary coupling members, one of said members being provided with a socket, while the other of said members is provided with a pin for pivotally engaging said socket, said pin having an elongated circumferential groove therein, and a latch for engaging said groove to hold said pin and socket in coupled relation to one another while permitting pivotal movement of said pin in said socket.

14. In combination, a pair of complementary coupling members, one of said members being provided with a socket, while the other of said members is provided with a pin for pivotally engaging said socket, said pin having a peripheral groove therein, a latch movable into and out of position to engage said groove to hold said pin and socket in coupled relation relative to one another while permitting pivotal movement thereof, and resilient means for moving said latch into holding position.

15. In combination, a pair of complementary coupling members, one of said members having a socket therein, while the other of said members is provided with a pin for pivotally engaging said socket, tapered guides for directing said pin into position in said socket, a latch for holding said pin and socket in coupled relation relative to one another, means on said latch to engage said pin to cause said latch to be retracted when said pin enters said socket, and resilient means for forcing said latch into holding position.

16. In combination, a pair of cooperating coupling members, one of said members being provided with a socket, a pin carried by the other of said members for pivotally engaging said socket to pivotally connect a pair of cars, said pin having a peripheral groove therein, a latch for entering said groove to retain said pin and socket in coupled relation while permitting pivotal movement thereof relative to one another, resilient means for moving said latch into engagement with said groove, said pin and latch being provided with a beveled surface for forcing said latch out of holding position while said pin is moving into said socket, and means for withdrawing said latch to permit said pin and socket to be disengaged from one another.

In testimony whereof I have signed my name to ths specification on this 30th day of June A. D. 1920.

CHARLES H. TOMLINSON.